United States Patent [19]
Johnson

[11] Patent Number: 5,886,662
[45] Date of Patent: Mar. 23, 1999

[54] METHOD AND APPARATUS FOR REMOTE MEASUREMENT OF TERRESTRIAL BIOMASS

[75] Inventor: Patrick W. Johnson, College Park, Md.

[73] Assignee: ZAI AMELEX, Vienna, Va.

[21] Appl. No.: 878,209

[22] Filed: Jun. 18, 1997

[51] Int. Cl.[6] .................................................. G01S 13/90
[52] U.S. Cl. .............................. 342/25; 342/192; 342/22; 342/197
[58] Field of Search .............................. 342/25, 22, 179, 342/180, 190, 191, 192, 194, 197

[56] References Cited

U.S. PATENT DOCUMENTS

| | | | |
|---|---|---|---|
| 4,184,155 | 1/1980 | Sivertson, Jr. | 342/25 |
| 4,495,500 | 1/1985 | Vickers | 342/25 |
| 4,739,332 | 4/1988 | Wiley | 342/180 |
| 4,866,446 | 9/1989 | Hellsten | 342/25 |
| 4,894,659 | 1/1990 | Andrews | 342/121 |
| 4,950,880 | 8/1990 | Hayner | 250/201.9 |
| 4,965,582 | 10/1990 | Hellsten | 342/25 |
| 5,053,778 | 10/1991 | Imhoff | 342/191 |
| 5,214,281 | 5/1993 | Rowe | 250/253 |
| 5,294,933 | 3/1994 | Lee et al. | 342/159 |
| 5,313,210 | 5/1994 | Gail | 342/25 |
| 5,335,181 | 8/1994 | McGuffin | 364/443 |
| 5,353,030 | 10/1994 | Koch et al. | 342/169 |
| 5,489,907 | 2/1996 | Zink et al. | 342/25 |
| 5,552,787 | 9/1996 | Schuler et al. | 342/25 |
| 5,745,069 | 4/1998 | Gail | 342/25 |

OTHER PUBLICATIONS

"Inverse Scattering Analysis of Diffraction Limited SAR", Hans Hellsten IEEE Transactions on Antennas and Propagation, vol. 38, No. 10, Oct. 1990 pp. 1517–1522.

P–3 ultra–wideband SAR: System applications to foliage penetration, Norm VandenBerg, Dan Sheen, Stan Shackman, Dave Wiseman, 130/SPIE vol. 2757, pp. 130–172.

"The Dependence of Synthetic Aperture Radar Backscatter On Forest Structure and Biomass: Potential Application For Global Carbon Models" Marc Lee Imhoff, May 1993, PhD Dissertation.

Polarimetric SAR Applications, Jakob J. van Zyl, Howeard A. Zebker and Charles Elachi, pp. 315–356.

Initial assessment of ATSR–2 data for retrieval of forest characteristics SPIE vol. 2585, pp. 12–188, Sep. 1995, Engman et al.

Primary Examiner—John B. Sotomayor
Attorney, Agent, or Firm—Sixbey, Friedman Leedom& Ferguson; Joseph S. Presta

[57] ABSTRACT

Method and apparatus for remote measurement of terrestrial biomass contained in vegetative elements, such as large tree boles or trunks present in an area of interest. The method includes providing an airborne radar system, overflying the area of interest while directing radar energy having a frequency of under 400 MHz, and preferably between 80 and 120 MHz, toward the area of interest, using the radar system to collect backscatter data from the radar energy as a function of incidence angle and frequency, and using an inversion algorithm to determine a magnitude of the biomass from the backscatter data for each radar resolution cell. A biomass map is generated showing the magnitude of the biomass of the vegetative elements as a function of location on the map by using each resolution cell as a unique location thereon.

28 Claims, 8 Drawing Sheets

METHOD AND APPARATUS FOR REMOTE MEASUREMENT OF TERRESTRIAL BIOMASS

GOVERNMENT LICENSE RIGHTS

The U.S. Government has a paid-up license in this invention and the right in limited circumstances to require the patent owner to license others on reasonable terms as provided for by the terms of Contract No. NAS 5-32735 awarded by NASA.

FIELD OF THE INVENTION

The present invention relates to a method and apparatus which enables gathering of data from an airborne platform to construct a map of a surface area which indicates the terrestrial biomass resident in trunks of large trees, crops or the like vegetative elements present on the surface area. More particularly, the present invention provides terrestrial biomass information for rain forests or the like which are concealed to other known detection and measurement methods and devices by a thick canopy of small branches and leaves. The invention enables a map to be generated which indicates the biomass of the vegetative elements as a function of location on the map.

BACKGROUND OF THE INVENTION

The instant invention was designed and developed to meet a need which exists to measure the biomass contained in the tree trunks or the like present in the world's great rain forests. More specifically, the motivation for developing the instant invention is to improve the NASA Global Warming Model. The Global Warming Model predicts the rise or fall of worldwide temperatures using mathematical equations. These equations have major variables, such as the magnitude and extent of the ozone levels, and the so-called "green-house gases" which may prove to impact global temperatures and climate patterns. One of these major variables is the total global amount of embedded $CO_2$. A large percentage of the embedded $CO_2$ is contained in the trunks of large trees located in the rain forests of the world.

Previously, there has been no method available for the direct measure of the terrestrial biomass contained in the tree trunks of the rain forests, other than by manual measurements. Manual methods require a person on the ground to measure the diameter and height of each tree. To improve the quality of the global estimation of the quantity of embedded $CO_2$ it was necessary to develop a technology which would allow for the rapid and remote sensing of the biomass contained in the rain forests world wide and thereby improve the quality of the Global Warming Model. Both the quantity and location of biomass are critical parameters for the modeling of $CO_2$ flux between the atmosphere and the biosphere for global climate modeling and the prediction of global warming. The measure of terrestrial biomass using conventional ground-based survey methods is difficult, time consuming and labor intensive. Thus, remote sensing is required for the investigation of biomass over the large geographic areas required for global modeling.

Associated with rain forests are thick and dense canopies consisting of small branches and leaves. Optical and infrared sensing systems, which are commonly used for the measure and estimation of certain types of global biomass, cannot see through the rain forest canopies. At optical and infrared frequencies, the energy interacts with the small branches and leaves of the canopy and is reflected back to the sensor. Only the approximate area and the associated biomass of the branches and leaves within direct view can be measured or estimated. The biomass contained in the tree trunks obscured by dense canopies cannot be directly measured or inferred by using currently available electro-optic or infrared sensors.

Recent studies have shown that the currently available Synthetic Aperture Radar (SAR) systems are unable to directly measure vegetative biomass effectively because the radar response saturates at relatively low levels of biomass density. The primary SAR systems previously used for biomass investigation are P-band (~500 MHz), L-band (~1 GHz), C-band (~5 GHz), and X-band (~10 GHz). The lowest frequency SAR currently in use by the geo-science community operates at 440 MHz, and reaches saturation at approximately 100 to 300 tons/ha. It is noted that all references to biomass herein relate to dry biomass. L and C-band systems are less capable, and saturate at still lower biomass densities. Over 80% of the Earth's terrestrial vegetative biomass exists in forest stands with biomass densities above the P-band system's saturation point. Many of the Earth's largest forests have biomass densities between 800 and 2000 tons/ha. Thus, lower frequency radar systems are required for the accurate estimate of terrestrial biomass.

The airborne radars currently being used for the remote sensing of biomass are multi-million dollar SAR systems. Current SAR technology has been developed primarily for high resolution imaging. The sophisticated and expensive SAR systems which have been developed generate data with spatial resolution in the range from 1 to 20 meters. In order to generate data with this high degree of resolution, large bandwidth and high power signals must be transmitted, driving up the cost of the transmitter. In order to control image distortion, the antenna usually must have provisions for motion compensation to remove variations in yaw, pitch and roll of the aircraft. The receiver must capture and digitize the large bandwidth signal, which must then be processed and stored. The data rate out of a SAR receiver is typically 10 to 100 MB per second, requiring state of the art processing equipment to record and process the data.

The overall sophistication of these systems drives the cost. A low cost radar system cannot attempt to compete with a sophisticated SAR system in terms of resolution and swath width. A radar sensor designed for commercial applications needs to be relatively simple and low cost. The spatial resolution requirements for biomass estimation are on the order of 50 to 500 meters, considerably larger than the resolution provided by most operating SARs. The present invention exploits this fact and provides a method and apparatus specifically for biomass estimation that is lower in cost (both in hardware and in the processing and storage costs), lighter, and simpler.

Many studies have been done using airborne or satellite-borne radar systems for the measure of terrestrial biomass. The SAR system is the primary type of radar system that has been used for these experiments. Historically, the primary funding for SAR research and development has been from the Defense Department with requirements for the surveillance, detection, and imaging of small targets such as tanks and trucks. In order to detect and image small targets, a 1–3 meter angular resolution is necessary. To achieve this degree of angular resolution at long ranges, frequencies above 400 MHz are usually required and implemented for imaging SAR systems. As a result, there have been few significant efforts with SAR surveillance radars below 400 MHz.

Frequencies above 10,000 MHz are rapidly attenuated by atmospheric absorption and are not militarily useful at other than very short ranges. These 400–10,000 MHz imaging SAR systems have been used in aircraft and satellites for biomass measurement and have been proven to be beneficial for the measurement of biomass under certain circumstances. There is a wealth of literature available dealing with the measure and estimation of terrestrial biomass with airborne or satellite-borne imaging SAR systems.

However, the trunks of the trees in the great rain forests lie beneath thick canopies of small limbs and leaves. The canopy reflects the majority of radar energy above 200 MHz. Therefore the tree trunks are not observable by microwave frequencies above 400 MHz. Recent studies have shown that the radar returns from systems above 400 MHz cannot estimate terrestrial biomass in a rain forest with densities above 200 tons/hectare. The same studies document that approximately 80% of the global terrestrial biomass lies in stands of trees with densities from 200 to 2000 tons per hectare. Additionally, the design and development of imaging SAR systems to produce 1–3 meter resolution is very complex and expensive. A typical imaging SAR radar system for target surveillance and detection costs in excess of $1M.

A different type of system is a non-imaging airborne radar system which has been developed to create detailed topographic maps. These maps are presented in plan view and give the elevations of the land surveyed with high resolution. A recent non-imaging airborne SAR type system has been successful in demonstrating the measurement of topography with a 1-meter resolution in elevation. For the mapping mission, frequencies from 10 MHz to 10,000 MHz have been used. At 10 MHz, almost all biomass is transparent. This allows the system to be used to create topographic maps of areas covered by dense rain forests. There are many other non-imaging systems and techniques at various frequencies which have been used successfully to create improved topographic maps in heavily wooded areas. All of these types of systems measure topographic elevations, but none are able to provide a direct measure of biomass. Several of these types of systems have been used to infer biomass estimates, but none have the ability to measure the biomass contained in the trunks of large trees directly.

A number of patents exist which generally relate to the technical field of the present invention. For example, the patent to Vickers, U.S. Pat. No. 4,495,500, disclosed a topographic data gathering method which uses a first radar operating at a frequency of around 200 MHz for penetrating foliage, and a second radar operating at a higher frequency of around 400 MHz. Vickers discloses that the data gathered from the radar can be processed in a manner which provides tree height information for use in determining the amount of timber that can be harvested from a particular area. The 200 MHz radar signal goes through most of the foliage and measures the distance to the ground. The second radar at 400 MHz is partially reflected by the foliage and gives a measure of the distance from the system to the approximate top of the trees. Subtracting one measure from the other gives the average approximate height of the trees. In tree farms, the trees are usually uniform in spacing and height, species, age, growth rate, and subsequently biomass. Therefore, in tree farms, where these conditions are met, the biomass of the trees can be correlated with the height of the trees, and an approximation of the amount of timber can be made. Where trees are of different height, species, age, growth rate, and are randomly located, estimates of biomass from the averaged approximate height cannot be accomplished. Thus, Vickers cannot be used to measure rain forests because of the variation in tree height, age, spacing, etc. This system also cannot be used for the measure of biomass in rain forests, because frequencies used are too high to penetrate the rain forest canopies. Vickers measures the distance to the ground and the approximate distance to the average tops of the trees and then calculates the approximate average height. Only average tree height is estimated. Any other details of biomass are not measured and must be inferred or assumed. Vickers discloses primarily a topographic mapping device. The output from the system of Vickers is a topographic map which indicates elevation data in plan view. For the reasons explained above, Vickers does not enable direct measurement of biomass contained in tree trunks in a rain forest.

The patent to Hellsten, U.S. Pat. No. 4,965,852, discloses a method for the radar topographic mapping of an area, and a device for wideband exploration at frequencies below 300 MHz, and preferably between 12.5 and 200 MHz. This system is used to generate high-resolution elevation maps presented in plan view. Hellsten addresses the specific topographic mapping and observes that the system is able to explore and determine the firm ground contour in forested areas. This makes topographic mapping possible in areas where the vegetation is too extensive for photogrammetrical methods to be usable. Hellsten produces high-resolution topographic maps. Because of the low frequencies, which penetrate foliage, the system can be used to make topographic maps in heavily forested areas. Although the system uses low frequencies, it does not make any direct measure of factors related to biomass.

The patent to Schuler, U.S. Pat. No. 5,552,787, discloses a SAR system designed to measure terrain elevation. The disclosure at column 2, lines 14–18 and column 14, lines 23–28 indicates that the invention can be used to provide "topographic information over a wide area so that geophysical parameters, when such information is needed to correct radar studies of soil moisture, biomass density, and crop type may be accurately measured by radar". Schuler produces a wide-area high-resolution topographic map, indicating elevation as a function of location presented in plan view. This detailed elevation map can be used to correct radar studies (from other radar systems) of soil moisture, biomass density, and crop type. There is no disclosure in Schuler of direct measurement of soil, biomass density, or crop type. This system does not measure or otherwise calculate biomass.

The patent to Gail, U.S. Pat. No. 5,313,210, discloses a polarimetric radar signal mapping process for use with an airborne or spaceborne platform. At column 2, lines 40–57, it is disclosed that "low frequencies are useful in penetrating deeply into areas with substantial vegetation." Gail observes that "it would be advantageous for a spaceborne polarimetric radar signal mapping process to be able to use such low frequency signals for biomass or other applications . . . " It is well known that the lower frequencies are more able to penetrate foliage and are useful in mapping areas of dense vegetation. However, Gail provides no explanation of how such measurements might be carried out.

The following U.S. Pat. Nos. also disclose related radar systems: 4,894,659; 5,053,778; 5,335,181; 5,353,030; and 5,489,907. All of these inventions make use of radar systems for the accurate determination of altitude or elevations, for the generation, correction, or simulation of SAR images or topographic maps. None of these Patents disclose a system which enables remote and direct measurement of biomass.

Accordingly, a need exists for an efficient and inexpensive system and method for directly measuring the terrestrial biomass resident in trunks of large trees, crops or the like vegetative elements present on a surface area of interest and concealed to other known detection and measurement methods and devices by a thick canopy of small branches and leaves or the like, and which enables a map to be generated which indicates the biomass of the vegetative elements as a function of location on the map regardless of the height, age, spacing and type of vegetation present.

SUMMARY OF THE INVENTION

Accordingly, a primary object of the present invention is to provide a method and apparatus for enabling direct measurement of the biomass contained in tree trunks or the like.

Another object of the instant invention is to provide a method and apparatus for enabling direct measurement of the biomass contained in tree trunks even when the trees are located beneath thick canopies of small branches and leaves.

Yet another object of the instant invention is to provide a method and apparatus for enabling the direct measurement of the biomass contained in tree trunks when the biomass density is above 200 tons per hectare.

Another object of the instant invention is to provide a method and apparatus for performing direct measurement of the biomass contained in tree trunks when installed in an aircraft for enabling high speed biomass measurements.

Still another object of the instant invention is to provide a method and apparatus for performing direct measurement of the biomass contained in tree trunks which uses a volumetric scan radiating a footprint which is, for example, circular with a 400 meter diameter, and which enables accurate measurement of the biomass in stands of trees with varying heights, ages and spacing.

A further object of the instant invention is to provide a method and apparatus for performing direct measurement of the biomass contained in tree trunks which is portable and low power.

Yet another object of the instant invention is to provide a method and apparatus for performing direct measurement of the biomass contained in tree trunks which can be used day or night and in all weather conditions.

Yet another object of the instant invention is to provide a method and apparatus for performing direct measurement of the biomass contained in tree trunks which use five or more discrete frequencies stepped across approximately 80–120 MHz.

Still another object of the instant invention is to provide a method and apparatus for performing direct measurement of the biomass contained in tree trunks which use a pulse coherent radar waveform.

These and other objects and advantages are achieved by the instant invention, which provides a method and apparatus for remote measurement of terrestrial biomass contained in vegetative elements present in an area of interest, wherein the method includes providing an airborne radar system, overflying the area of interest while directing radar energy having a frequency of under 400 MHz, and preferably between 80 and 120 MHz, toward the area of interest, wherein a plurality of radar resolution cells are defined on the area of interest, using the radar system to collect backscatter data from the radar energy as a function of incidence angle and frequency for each radar resolution cell, and using an inversion algorithm to determine a magnitude of the biomass from the backscatter data for each resolution cell.

In accordance with another aspect of the instant invention, a plurality of different discrete radar frequencies under 400 MHz, and preferably between approximately 80 MHz to approximately 120 MHz, are used to collect backscatter data for each resolution cell.

In accordance with a more particular aspect of the instant invention at least five different and discrete radar frequencies are used for each resolution cell.

In accordance with a further aspect of the instant invention, five radar frequencies are used and selected to be approximately 80 MHz, 90 MHz, 100 MHz, 110 MHz and 120 MHz.

In accordance with a further aspect of the instant invention, the airborne radar system includes synthetic aperture radar processing and a pulsed coherent radar.

In accordance with a further aspect of the instant invention, a map is generated of the area of interest in plan view showing the magnitude of the biomass of the vegetative elements as a function of location on the map by using each of the resolution cells as a unique location thereon.

In accordance with still a further aspect of the instant invention, a receive only scan of a usable frequency spectrum is performed to identify other RF frequencies in use for television and radio, and the frequency(s) used to collect the backscatter data are selected to avoid the identified commercial and emergency frequencies in use, as well as to avoid regions of high ambient noise.

In accordance with a more particular aspect of the instant invention, the method and apparatus are used to determine the biomass contained in crops or the soil characteristics located within said area of interest.

BRIEF DESCRIPTION OF THE DRAWINGS

Other objects and advantages of the subject invention will become apparent from a study of the following specification when viewed in light of the accompanying drawings, in which.

DETAILED DESCRIPTION OF THE PREFERRED EMBODIMENTS

Experiments were conducted during the initial development of the instant invention to determine the feasibility thereof. More particularly, experiments were conducted in which two stands of trees of known biomass were used to determine the optimum frequencies for the measure of biomass contained in the trunks of large trees. The experiments demonstrate that the use of five individual measurements taken at five different frequencies over the 80–120 MHz range (for example 80, 90, 100, 110, and 120 MHz) can advantageously be used for the determination of the biomass of tree trunks. The results of experimentation demonstrated the ability to measure stands of trees with varying heights, ages and spacings, and to determine the biomass in units of tons per hectare.

Before discussing the specific details of the instant invention, the initial experimentation and results thereof which led to the development of the instant invention will be explained below.

During the initial experiments, radar backscatter measurements at VHF (30–300 MHz) and low UHF (300–3000 MHz) frequencies were taken in an effort to establish a relationship between the volumetric radar cross section and the vegetative biomass in tons per hectare. A set of ground based measurements were made as part of a preliminary study for the development of an airborne sensor. These measurements were taken on two stands of trees, estimated through biometric analysis to have biomass densities of 157 and 622 tons per hectare.

Figure 2:
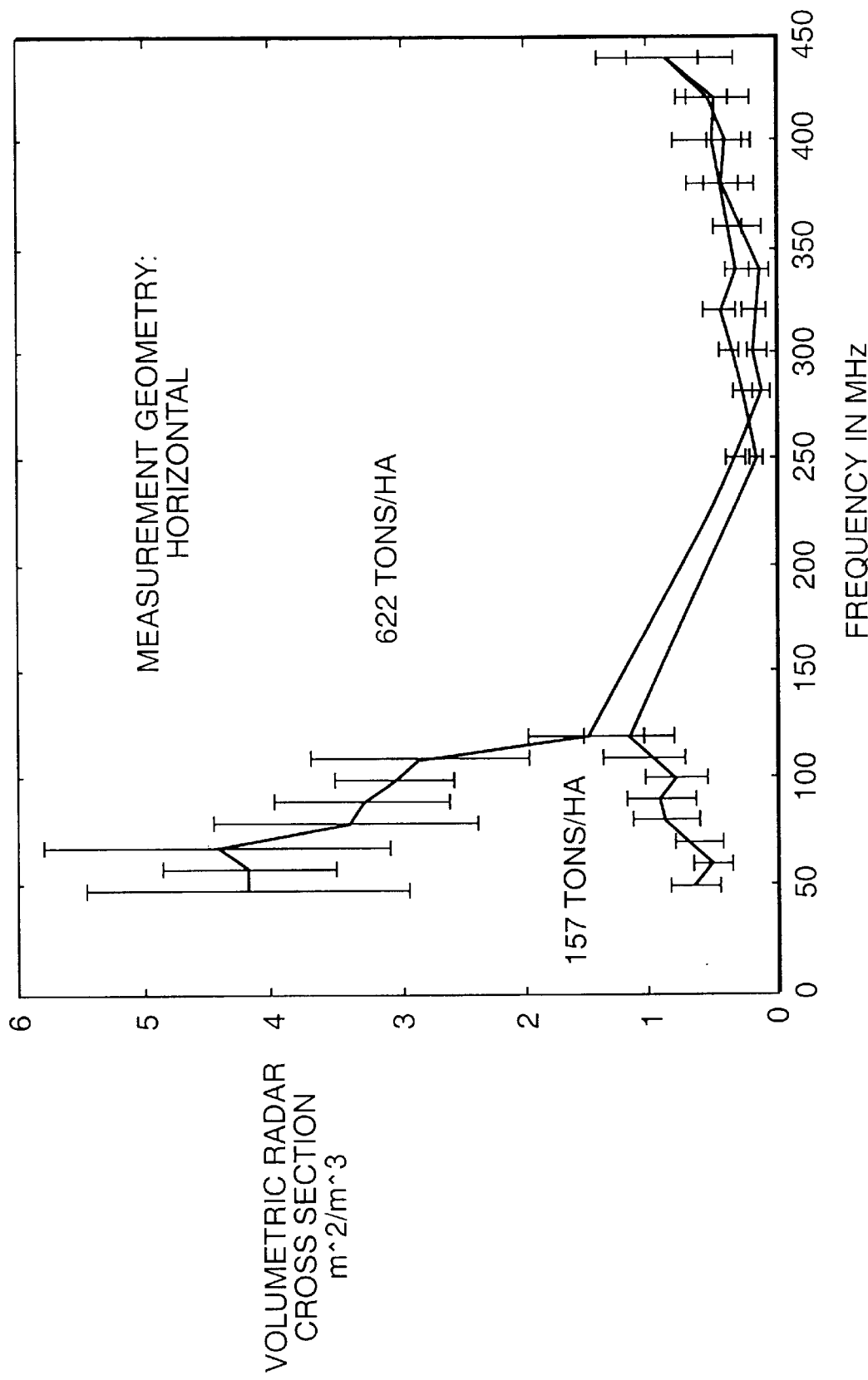
FIG. 2. is a graph showing Radar Cross Section (RCS) versus frequency showing the differentiation between low and medium density biomass and the saturation effects of higher frequencies.

In the data collected and analyzed, the normalized volumetric radar cross section showed a dramatic saturation effect for frequencies above 120 MHz (see FIG. 2). The extinction coefficient and resulting propagation path loss increased with frequency and biomass density. Electromagnetic modeling was performed and indicated that the saturation effect in the backscatter measurements is a strong function of both measurement geometry and polarization. These results indicate that radar backscatter data collected as a function of both incidence angle and frequency can be used to estimate biomass.

The first objective of the experiments was to establish the sensor requirements for biomass estimation. Available literature on biomass estimation lead to the conclusion that the saturation effect observed with current sensors was primarily due to the lack of penetration of the foliage by the electromagnetic radiation emitted by the radar sensor. This conclusion necessitated the use of VHF frequencies to achieve greater foliage penetration. The electromagnetic attenuation properties of forests are not well understood, and are difficult to model accurately because tree geometry is relatively complex, and contains many elements on the order of a wavelength, especially at shorter wavelengths. The biomass of each individual tree was estimated as a function of its height, circumference, and bulk density. Thus, it was determined that a radar sensor that is sensitive to the height and diameter of the tree will be able to provide estimates of the biomass of a tree stand, given the species of the tree.

Significant foliage penetration was achieved with the VHF radar, and the data was collected with a horizontal measurement geometry that provided grazing incidence of the electromagnetic radiation on the ground. The grazing incidence angle results in very little backscatter from the ground. The physical process of the electromagnetic scatter from the trees was modeled as volumetric scatter. In this case, both the backscatter coefficient and the extinction coefficient must be measured to adequately model the phenomenon. This required two experimental setups to demonstrate the validity of this approach. The two experimental set ups for optical depth measurements and for the backscatter measurements are discussed below.

The radar system, including the transmit and receive antenna system, used for the experiments was a known and typical radar system, wherein a pulse generator generated 35 ns pulses which simultaneously switched the RF on, using a GaAs FET switch, and triggered an oscilloscope. A 35 ns transmit pulse width was selected as a compromise between the wide bandwidth necessary to generate independent samples, and the power bandwidth limitations of the equipment. The RF pulse was amplified up to 800 mW and radiated by the antenna. Vertical conical monopole antenna arrays were mounted on an 8 by 4 meter section of ground screen constructed of fine aluminum mesh to guarantee a highly conductive ground and to ensure that the antenna pattern was close to its design specifications. The radar pulse scattered off the target and propagated back to the receive antenna, which was basically similar to the transmit antenna. An amplifier chain raised the level of the received signal and a Schottky diode was used to produce a voltage that is proportional to the received power level. A digital oscilloscope was used as the data acquisition system, and its measurements were stored on a PC compatible floppy disk. Since the oscilloscope was triggered at the same time the pulse was generated, the elapsed time between the transmitted and received signal measured by the oscilloscope is the sum of the delay through the system and the propagation delay of the pulse.

The measured backscattered power had an exponential distribution, as expected from a distributed target. One characteristic of this statistical distribution is that the mean is equal to the standard deviation. In order to make meaningful estimates of the mean, multiple statistically independent samples must be averaged together. This will reduce the standard deviation by the square root of the number of samples averaged for incoherent averaging.

Statistically independent samples were generated by moving the radar one half of the aperture of the antenna and by collecting data in several range gates. Care was exercised when selecting which independent samples to average, so that the target characteristics were as similar as possible. Averaging the data from areas with different target characteristics will corrupt the results. Radar measurements for remote sensing of the environment are typically reported with a relative accuracy on the order of 0.25 –1.5 dB, and an absolute accuracy between 1 and 3 dB. The relative accuracy is given by the variance of the radar data, which, for a distributed target, is determined by the number of statistically independent samples averaged and the signal to noise ratio of the data, as shown below for incoherent averaging:

$$\frac{\delta_s}{P_s} = \sqrt{\frac{1}{N_r}\left(1+\frac{1}{SNR}\right)^2 + \frac{1}{N_n}\left(\frac{1}{SNR}\right)^2}$$

where SNR is the signal to noise ratio, $N_r$ is the number of samples of the received power that are averaged, $N_n$ is the samples of the noise that are averaged, $P_s$ is the desired signal, and $\sigma_s$ is the relative standard deviation of the data.

Assuming that the noise is a zero mean process, incoherent averaging of the data also improves the signal to noise ratio of the data by the square root of the number of samples averaged. Table 1 shows the relative accuracy of the measurements and the signal to noise improvement as a function of the number of independent samples averaged, assuming that there is a large signal to noise ratio.

TABLE 1

| Number of Samples | Relative Accuracy | SNR Improvement |
|---|---|---|
| 15 | +/−1.0 dB | 5.88 dB |
| 68 | +/−0.5 dB | 9.16 dB |
| 285 | +/−0.25 dB | 12.27 dB |

The necessary independent samples were generated for the backscatter measurements by averaging range gates, and setting the radar up in several positions. The total quantity of data was determined by the number of tree stands measured, the number of frequencies used, the number of range gates collected, and radar positions used. Two stands of trees were selected, 18 frequencies were used, and the biomass was constant over 10 range gates and 9 radar positions. This resulted in 3240 total backscatter measurements. Dividing these into 36 biomass/frequency bins results in 90 samples per bin, resulting in a relative accuracy of 0.44 dB, and a signal to noise improvement of 9.77 dB.

The independent samples for the optical depth measurements can only be generated by repositioning the transmitter and receiver. Two stands of trees were measured at 18 frequencies and 9 azimuth positions resulting in 324 total optical depth measurements. Dividing these into 36 biomass/frequency bins results in 9 samples per bin, with a relative accuracy of 1.25 dB, and a signal to noise improvement of 4.77 dB.

The absolute accuracy of the radar data is determined by the calibration of the radar. The appropriate test gear and facilities were obtained, and an absolute calibration of approximately 2.9 dB was achieved as explained below.

Two stands of trees were selected: one that had a relatively high biomass density (622 tons/ha), and a second with a moderate biomass density (157 tons/ha) to provide contrast. Both stands had readily available ground truth. The volumes of individual trees were estimated by modeling the tree trunk as a cylinder, as tree height and diameter measurements were available. The biomass of the trees was calculated using the calculated volume of the tree and published bulk density for the individual tree species. The data was collected in the Belt Woods forest in Bowie, Md. in February and March, so that the deciduous trees were in the leaf off condition. The ambient temperature was above 50° F. before and during the experiment so that the trees were not frozen.

The radar measurements were taken with vertically polarized radiating elements for practical measurement reasons; that is, a horizontally polarized radiating element close to a ground plane will not radiate in a direction parallel to the ground plane. Therefore, neither horizontal nor circularly polarized measurements were possible using this geometry at these frequencies without a large tower.

The transmit and receive antennas were arrays of vertical conical monopoles. For frequencies between 50 and 120 MHz, the transmit and receive antennas were two element arrays. For frequencies between 250 and 440 MHz the transmit and receive antennas were four element arrays, made from parallel combinations of the two element arrays.

The antenna arrays were fed in series with a coaxial transmission line feed, and phased so as to produce a cardioid pattern. The relative azimuthal patterns for the low and high frequency antenna arrays resulting from a method of moments analysis were calculated using 90 MHz for the low frequency antenna and 350 MHz for the high frequency antenna.

The calibration of the antennas was accomplished using three antennas and making transmission measurements. The transmission measurements involved two unknowns (the gain of the transmit and receive antennas), and required at least three measurements at each frequency, along with a third antenna. The third antenna is required because the transmission measurements are reciprocal, i.e. the transmit and receive antennas can be interchanged without affecting the measurement. The setup involving three antennas creates a system of three equations and three unknowns. The three antennas used were the transmit antenna, the receive antenna and a vertical conical monopole antenna.

Since the conical monopole antenna is omnidirectional in azimuth, the alignment of the antennas was greatly simplified. The calibration procedure, was performed at the Naval Research Laboratory's (NRL) Brandywine Facility, and yielded the maximum gain of each of three antennas with three measurements, using the radar transmitter and the receiver. The NRL Brandywine facility provides a 1000 foot flat ground screen to eliminate multi-path effects and to approximate an infinite, perfect ground plane.

The transmitter and the receiver must be set up some distance R away from each other, in the far field of both antennas. The far field of the antennas is given by $$R_{min} = \frac{2D^2}{\lambda}$$

where $P_{min}$ is the minimum distance, D is the largest linear dimension of the antenna, and $\lambda$ is the electromagnetic wavelength. In that case the power measured by the receiver, neglecting multi-path interference, is given by:

$$P_r = \frac{P_t G_t G_r \lambda^2}{(4\pi R)^2}$$

If the rest of the parameters are kept constant and set equal to k, and three measurements are made by interchanging three antennas, the following set of equations results:

$$P_1 = kG_1G_2 \quad P_2 = kG_1G_3 \quad P_3 = kG_2G_3$$

which leads to:

$$G_t = \sqrt{\frac{P_1 P_2}{kP_3}} \quad G_2 = \sqrt{\frac{P_1 P_3}{kP_2}} \quad G_3 = \sqrt{\frac{P_3 P_2}{kP_1}}.$$

The antenna was calibrated and it was determined that a calibration model was biased about 1 dB higher than the measurements, and the standard deviation of the measurements is 2.6 dB. The bias was most likely the result of losses in the feed network that were not included in the model. The 2.6 dB uncertainty in the antenna measurements is the greatest source of error in the system calibration. When this uncertainty is root-sum-squared with the quantization error (0.125 dB) and the diode's deviation from square law (0.5 dB), the resulting overall calibration of these measurements is 2.93 dB.

In the bistatic measurement set up, the transmitter was placed in the woods, and the receiver was placed in a clear area out of the woods. This set up was used to measure the extinction coefficient associated with a particular stand of trees as a function of frequency and biomass per hectare. The power measured by the receiver in this set up is given by:

$$P_r = \frac{P_t G_t G_r \lambda^2}{(4\pi R)^2} e^{-\tau}$$

where $\tau$ is the optical depth. The optical depth is the integral of the extinction coefficient $K_e$ over the path of propagation 1 through the stand of trees, given by:

$$\tau = \int_0^R \kappa_e dl$$

A pulsed waveform was transmitted during the optical depth measurements, and six pulse repetition intervals were recorded at each measurement. These measurements were averaged together, and the average noise level was subtracted to reduce the variance and the bias introduced into the received power measurements by the noise. Measurements were made at 9 azimuthal positions at each site, and at 18 frequencies for each azimuthal position. The data from each azimuthal position was averaged together to yield 9 independent samples per frequency. A pulsed waveform was chosen to reduce the effects of multi-path interference on the measurements. The power that propagated on a direct path from transmitter to receiver had the smallest propagation delay. The multi-path interference was separated from the direct path by its longer time delay.

Figure 1:
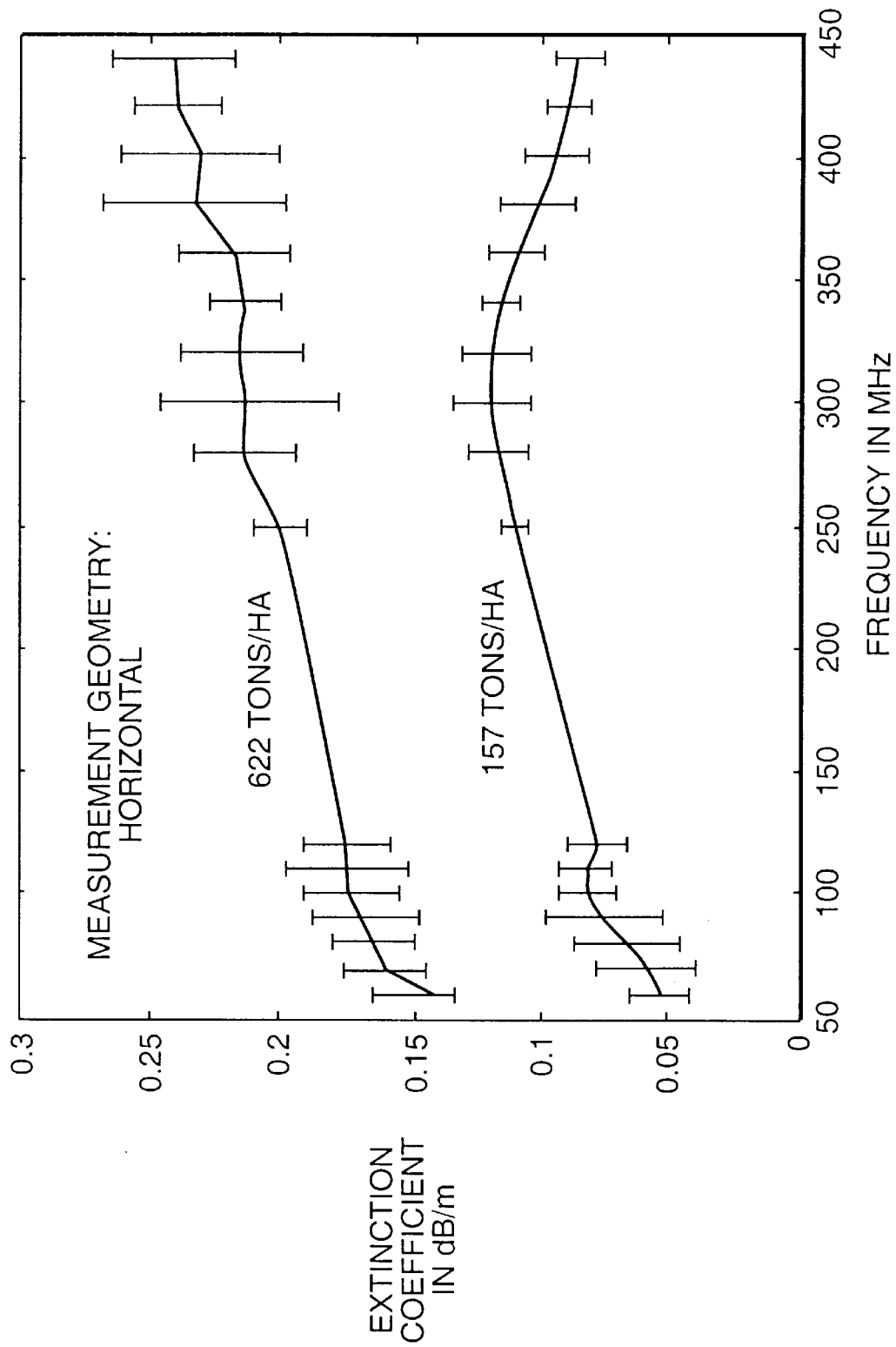
FIG. 1. is a graph showing extinction coefficients calculated from transmission measurements taken in connection with two stands of trees.

The integrated path loss was calculated as the ratio of the actual received power to calculated power received over a path of the same distance over bare ground. This integrated path loss was then normalized to an extinction coefficient by assuming the loss rate to be constant as a function of distance, and the resulting data in dB per meter is shown in FIG. 1.

The gap in the measurements between 120 MHz and 250 MHz is the result of the tradeoffs reviewed and selected for the antenna arrays. The elements are in a phased array, and the bandwidth of the antenna is limited because of the fixed spacing and mutual coupling effects. Two arrays were designed, and used to cover as much of the desired bandwidth as possible with a practical number of measurements.

Once the extinction coefficient for the stand of trees had been computed from the bistatic measurements, the radar backscatter measurements were used to estimate the volumetric radar scattering cross section of the trees. For these measurements, the transmitter and the receiver were placed next to each other, and their respective antennas were pointed in the same direction to observe the backscatter from the foliage. The power measured at the receiver in this case is given by:

$$P_r = \frac{\lambda^2}{(4\pi)^3} \iiint_{\text{Volume}} \frac{P_t G_t G_r \sigma_v}{R^4} e^{-2\tau} dV$$

where $\sigma_v$ is the volumetric scattering coefficient, R is the range to the target $P_t$ is the transmitted power, $G_t$ is the gain of the transmit antenna, $G_r$ is the gain of the receive antenna and $\pi$ is the electromagnetic wavelength. The transmit pulse was modeled as a Gaussian whose magnitude was derived from the calibration data, and the volumetric radar cross section was assumed to be constant in each range-azimuth bin. The low band antenna pattern was modeled as $$G(\theta,\phi) = \frac{G_o}{2} (1 + \cos(\phi))(a + b\theta + c\theta^2)$$

and the high band antenna was modeled as $$G(\theta,\phi) = \frac{G_o}{4} (1 + \cos(\phi))^2 (a + b\theta + c\theta^2)$$

where $G_o$ is the maximum measured antenna gain at each frequency. A second order polynomial was fit to the variation of the antenna pattern in elevation for angles from 0 to 30 degrees for each frequency. The elevation pattern was calculated for the high band array at 350 MHz over a 4 meter ground screen surrounded by lossy ground. The volumetric radar cross section of each bin was calculated by numerical integration.

A pulsed waveform was transmitted during the radar backscatter measurements, and six pulse repetition intervals were recorded at each measurement. These measurements were averaged together, and the average noise level was subtracted to reduce the variance and the bias introduced into the received power measurements by the noise. Measurements were made at 9 azimuthal positions at each site, and at 18 frequencies for each azimuthal position. Each measurement yielded approximately 10 range gates where the biomass density was nearly constant. The data from each azimuthal position and selected range gate were averaged together to yield 90 independent samples per frequency.

The previously calculated extinction coefficient was used to remove the attenuation effects of the foliage so that the volumetric radar cross section could be calculated as a function of frequency.

This data is shown in FIG. 2. The uncertainty in this data is driven primarily by the uncertainty associated with the optical depth estimates. The limited number of independent samples in the optical depth measurements is responsible for the overall uncertainty in these results. However, even with the relatively large error bars on the data, a statistically significant saturation effect can still be observed for those frequencies over 120 MHz. This result is highly dependent upon the measurement geometry and polarization of the incident electromagnetic radiation.

FIG. 2 shows the radar returns from the experimental data from the two stands of trees. The upper curve is the Volumetric Radar Cross Section of a stand of trees with a density of 622 tons/hectare. The bottom curve is from a less dense stand of trees with a density of 157 tons/hectare. As can be seen from FIG. 2, these density differences can be observed and measured under the conditions described above.

The results of the experiments were then considered with respect to and extended to an airborne radar system.

Figure 8:
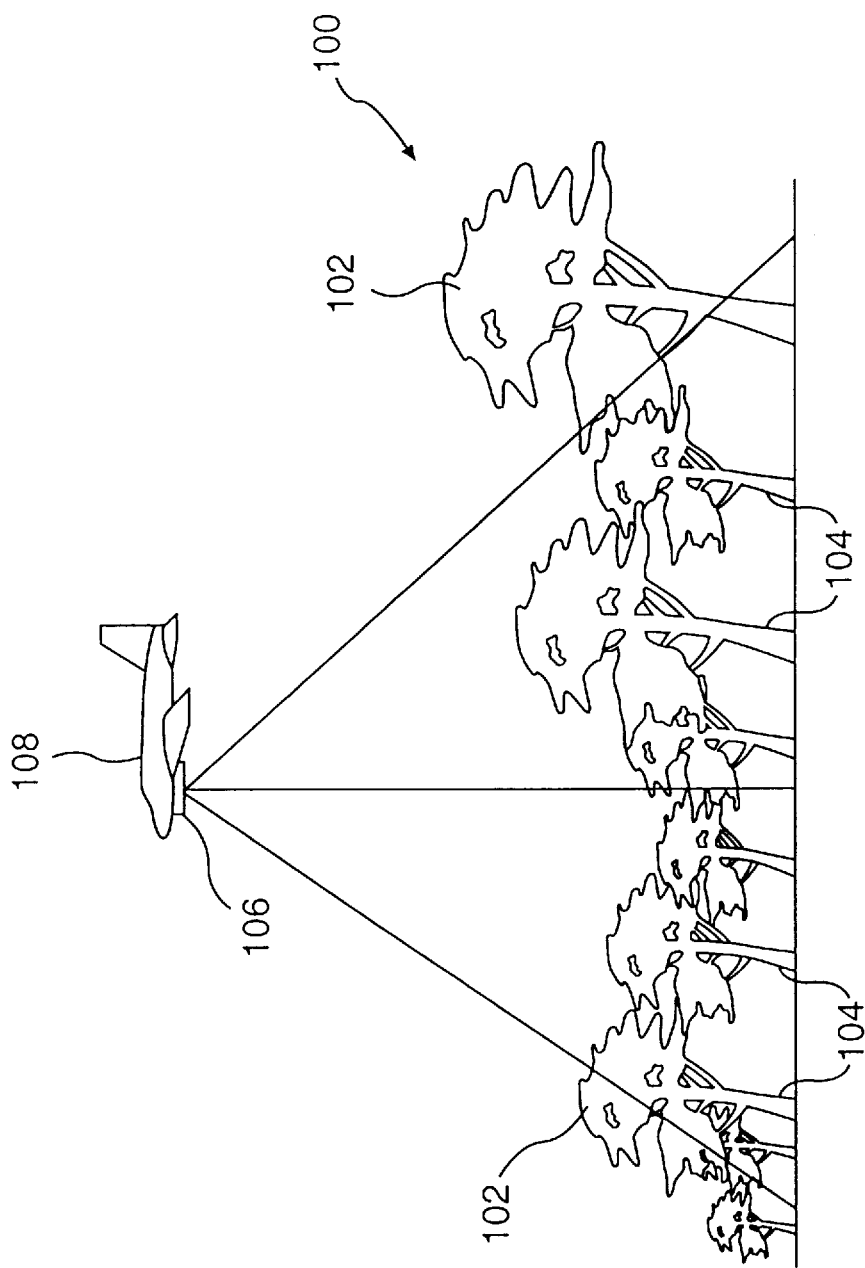
FIG. 8. is a schematic view of an airplane with the radar system of the present invention mounted thereon and overflying a forest of interest.

FIG. 8 shows a generic rendering of a typical stand of trees of interest 100. The main areas affecting the successful operation of the invention is the canopy of the trees 102 consisting of leaves and small branches. The bulk of the biomass of interest lies in the bole or the trunk 104 of the tree which is obscured by the canopy 102. For the airborne system, the radar 106 is carried by an aircraft 108 in a downlooking manner. The aircraft 108 is used to overfly the forest 100 in order to collect data with the radar 106.

The primary scattering targets in the radar data collected are the tree trunks 104, and tree trunks may be modeled as lossy dielectric cylinders. The scattering from dielectric objects can be quite complicated because the incident electromagnetic energy is able to penetrate the object. This results in multiple internal reflections, where some energy is re-radiated at each internal reflection. A lossy dielectric media suppresses these internal reflections by absorbing the penetrating energy. A simplifying limit of a dielectric model is a perfect electric conductor, that reflects all of the incident energy, thus eliminating the internal reflections.

A perfect electric conductor model of a cylinder was used to investigate the variation of the radar cross section of the tree trunks. For a lossy dielectric, the perfect electric conductor model will tend to over estimate the radar cross section, and simplify the scattering pattern. However, this model will greatly simplify both the computation and the results of the electromagnetic scattering. Using a physical optics approximation, this model yields the following result for the radar cross section of a cylinder of length L and radius a for vertical polarization:

$$\sigma = \frac{4L^2}{\pi} \left| \sum_{n=-\infty}^{n=+\infty} \frac{j_n(ka)}{H_n^{(2)}(ka)} e^{jn\phi} \right|^2 \left| \frac{\sin(kL\sin(\theta))}{kL\sin(\theta)} \right|^2$$

wherein k is the electromagnetic wave number, θ is the incidence angle, φ is the azimuth angle as measured between the incident and scattered waves, $J_n$ is a Bessel function of the first kind of order n, and $H_n^{(2)}$ is a Hankel function of the second kind of order n.

Figure 3:
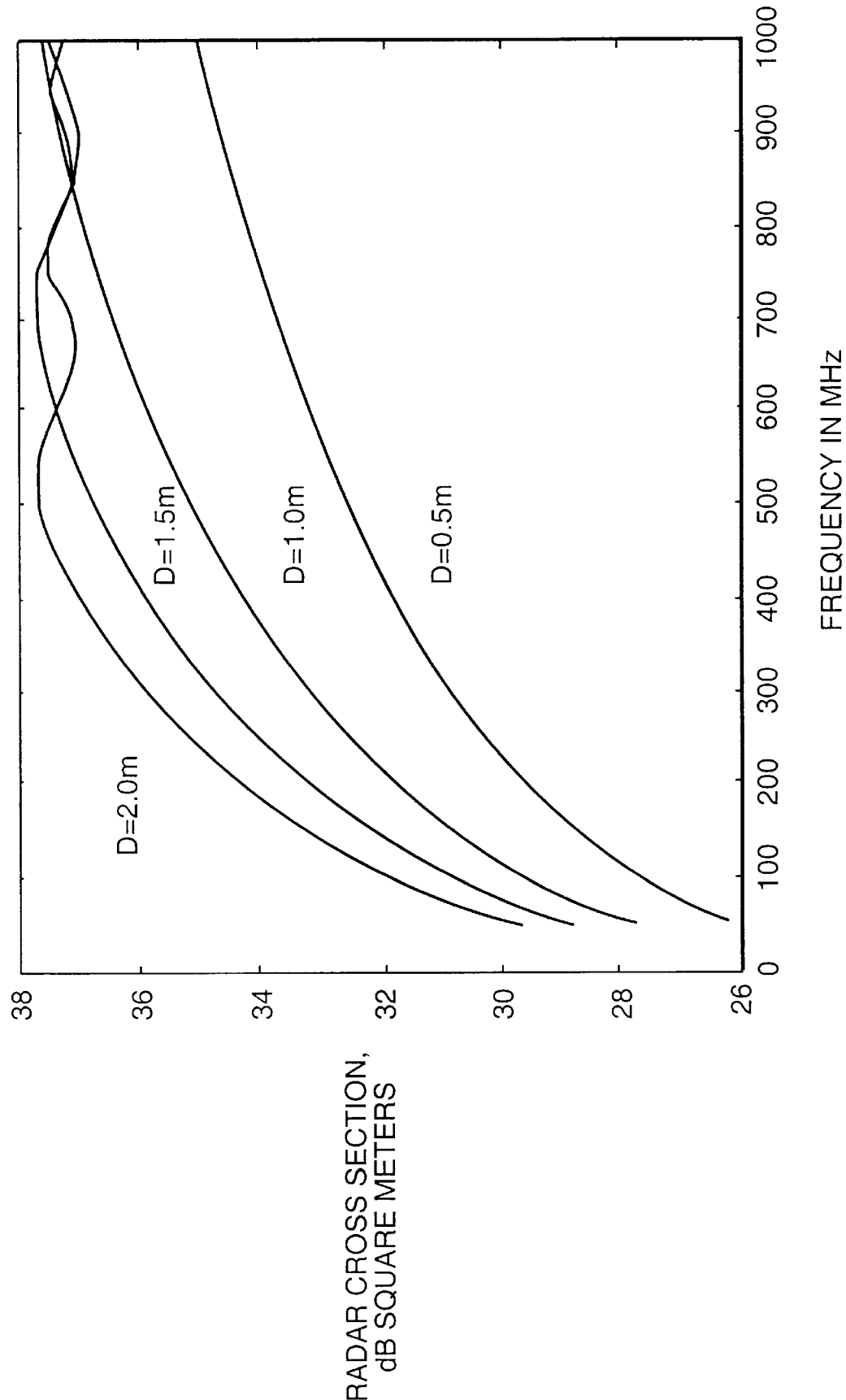
FIG. 3. is a graph showing the variation of the maximum radar cross section of a cylinder as a function of frequency, wherein a family of curves is shown for various diameters of a 20 meter long cylinder.

FIG. 3 shows the variation of the maximum radar cross section of the cylinder as a function of frequency. A family of curves is presented for various diameters of a 20 meter long cylinder. The radar cross section of the cylinder saturates to an optical limit, and that saturation point depends on both the diameter of the cylinder and the frequency for normal incidence. From FIG. 3 it can be seen that the diameter of the cylinder can be estimated from the variation of the radar cross section cylinder with frequency.

Figure 4:
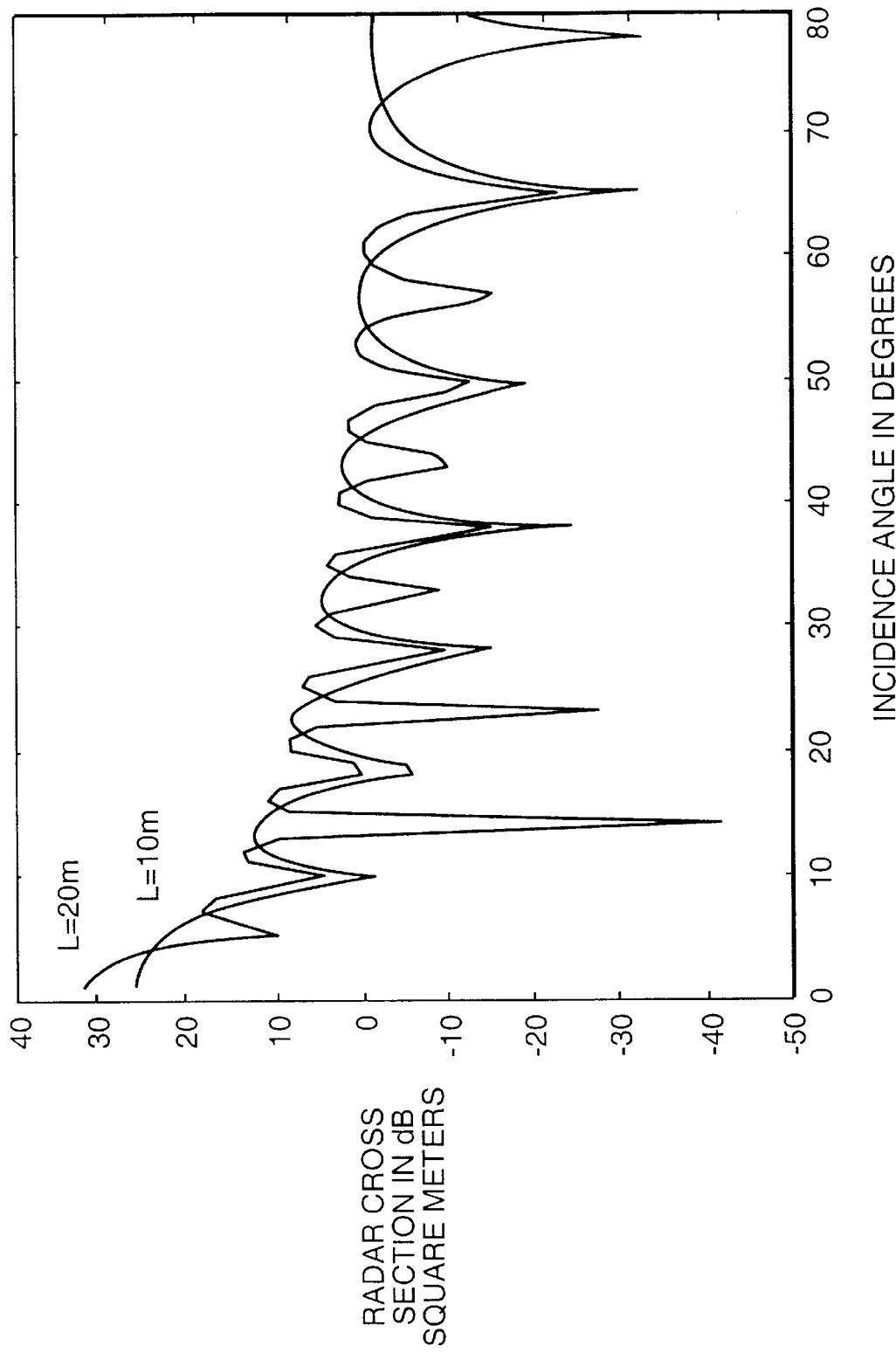
FIG. 4. is a graph showing the variation of a one meter diameter cylinder as a function of incidence angle for a frequency of 100 MHz, wherein the graph shows two curves representing cylinders of 10 and 20 meters.

FIG. 4 shows the variation of a 1 meter diameter cylinder as a function of incidence angle for a frequency of 100 MHz. Two curves representing cylinders of 10 and 20 meters are presented. The variation of the cylinders' radar cross section as a function of incidence angle is clearly strongly dependent on the length of the cylinder.

Given these two results, and in accordance with the instant invention, it was determined that an airborne radar that measures the normalized radar cross section of a tree stand as a function of both frequency and incidence angle will be able to determine the biomass of the tree stand. More particularly, the variation of scattering cross section with frequency will be related to the ensemble average diameter of the trees in a given resolution cell, and the variation of the scattering cross section with incidence angle will be related to the ensemble average of the height of the trees. The magnitude of the backscatter will be related to the number of trees per hectare in the radar footprint. The height, diameter, and number of trees, together with a bulk density of the specific tree species, is then used to estimate the biomass of the observed forest.

To summarize the experiments and conclusions, radar backscatter measurements at VHF and low UHF frequencies were taken to establish a relationship between the volumetric radar cross section and the vegetative biomass of moderately to relatively dense tree stands without leaves. These stands of trees were estimated to have biomass densities of 157 and 622 tons per hectare based on the biometric analysis of the data provided by the Maryland Department of Natural Resources for the Belt Woods State Forest. The radar system was calibrated, and the measurements were converted from received power to volumetric radar cross section by numerical integration of the illumination integral.

The normalized volumetric radar cross section showed a dramatic saturation effect for frequencies above 120 MHz. This saturation effect was evidenced by a difference in backscatter coefficient between the two tree stands that was small in comparison to the relative uncertainty for frequencies above 120 MHz. For lower frequencies, there was a statistically significant difference between backscatter coefficients measured for the two tree stands. The relative uncertainty in the backscatter measurements was driven in large part by the relative uncertainty in the optical depth measurements.

The extinction coefficient and resulting propagation path loss increased with frequency and biomass density. The relative uncertainty in these measurements was due to the limited number of independent samples collected. The optical depth measurements were very labor intensive, requiring the receiver to be physically moved and reassembled for each independent sample collected, constraining the number of independent samples collected.

Modeling and interpretation of the electromagnetic scattering from a perfectly conducting cylinder lead to the conclusion that a VHF radar that measures the normalized radar cross section of a tree stand as a function of both frequency and incidence angle will be able to determine the biomass of the tree stand. The VHF radar signal will be able to penetrate the crown structure, largely unaffected by the minor canopy structure. This system allows direct measurement of the tree boles which contain 90% of the biomass for mature stands, and will provide a direct link to a primary component of the biometry of the tree stand.

As explained above, the variation of scattering cross section with frequency is used to determine the ensemble average diameter of the trees in a given resolution cell, and the variation of the scattering cross section with incidence angle is used to determine the ensemble average of the height of the trees. The magnitude of the backscatter at a particular frequency and incidence angle are related to the number of trees per hectare, as well as the average height and diameter. The height and diameter, together with a bulk density of the specific tree species, are used to estimate the biomass of the observed forest. This technique will provide biomass estimates over a much broader range of biomass than is currently possible. Since this technique is primarily sensitive to the geometry of the tree boles, it is significantly more invariant with respect to seasonal changes than current techniques that are primarily sensitive to the crown structure of the trees.

The results of the experimental research described above were used to develop the method and apparatus of the instant invention. The invention provides a greatly simplified device in comparison to the currently available airborne SAR systems. In accordance with a preferred embodiment of the instant invention, the radar device uses a nadir-looking antenna array, a low power pulsed transmitter, and a Doppler processing receiver to achieve the necessary resolution. The return will be range-gated to limit the cross-track field. The radar system derives its across track resolution from the antenna beamwidth in that dimension, and its along track resolution from Doppler processing. The radar transmits an interrupted continuous wave waveform, where a pulse is transmitted whose length is approximately the entire round-trip propagation time for the altitude of the aircraft on which the device is mounted. This enables the use of narrow bandpass filters to suppress external noise and interference. The pulse repetition interval is approximately twice the transmitted pulse length, so that the duty cycle of the transmitter is nearly 50%.

The instant system is operable to collect data both as a function of incidence angle and frequency. The variability of the data with respect to these two parameters provides enough information to adequately model the response from a forest canopy of unknown density over a soil of unknown dielectric characteristics. By using an accurate model, both biomass density and sub-canopy soil characteristics are estimated from this data.

Due to ground clearance issues and the size of the radar system used, any suitable light twin engine aircraft is the preferred aircraft for implementing the present invention. However, any suitable manned or unmanned aircraft, or even a suitable satellite, can be used as the radar platform. The system needs to be rugged enough to withstand field usage, especially the vibration associated with flying on a propeller driven aircraft.

In accordance with the instant invention, a simplified broad band antenna can be used on the aircraft. For example, the antenna may be a two element array, where the array elements are open sleeve dipole antennas. The antenna may, for example, have a Voltage Standing Wave Ratio (VSWR) less than 2.5:1 over a 100% bandwidth from 60 to 120 MHz, and a nominal gain of 10 dBi. A relatively simple matching network can be used to reduce the antenna's VSWR to less than 2:1 over this bandwidth. Several frequencies are selected in this bandwidth, and are used to determine the variation of the radar cross section as a function of frequency. The frequencies are preferably chosen so as to mitigate radio interference. The antenna may be mounted in any suitable manner on the aircraft or suspended below the aircraft, and the aircraft itself may act as a ground plane. The E-plane and H-plane far field patterns of the array can be calculated in a known manner, such as using a method of moments computer code.

Figure 5:
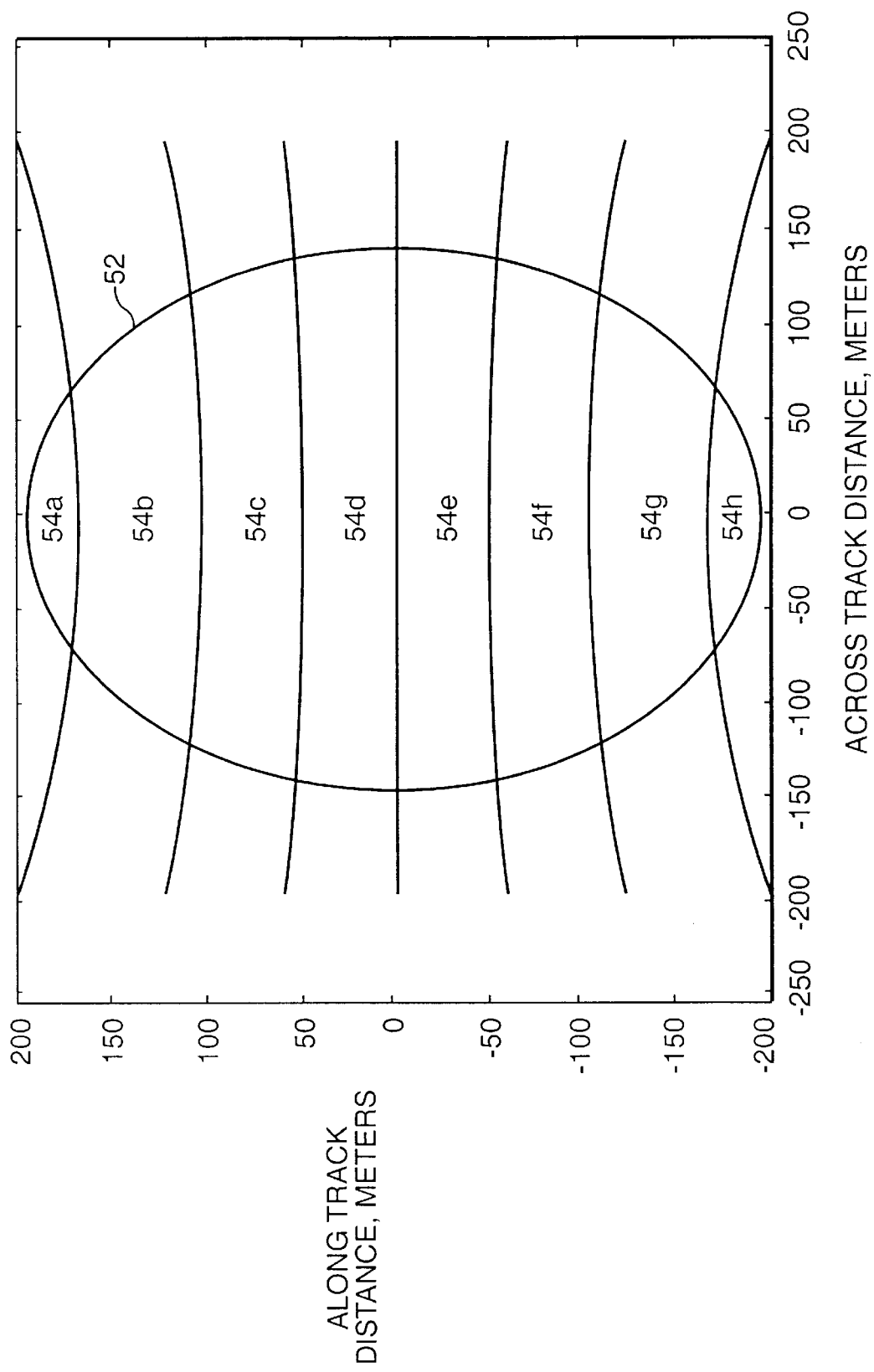
FIG. 5. shows an example radar footprint and resolution contours or bins formed by a half power beamwidth of one embodiment of an antenna array from an altitude of 300 meters and 10 Hz bins resulting from Doppler processing.

FIG. 5 shows an example of the radar footprint and associated radar resolution contours or cells formed by the half power beamwidth of the antenna array from an altitude of 300 meters and 10 Hz bins resulting from Doppler processing. In order to perform Doppler processing, the in phase and quadrature (I and Q) components of each pulse must be recorded. If the altitude is taken to be 300 meters, the pulse width will nominally be 2 $\mu$s, and the minimum pulse repetition interval is 4 $\mu$s (the waveform is repeated at a frequency of 250 kHz). Thus, in this embodiment, the analog to digital converter (ADC) needs to be able to capture data at 500 kHz from the two channels. This requirement is two orders of magnitude below the state of the art for a commercial 12 bit ADC board, and as a result the invention is relatively simple and inexpensive to implement.

For conventional Fourier processing, the observation time required is roughly the inverse of the Doppler resolution required. For the 10 Hz resolution, 0.1 seconds are required. As an example, a light twin engine aircraft typically cruises approximately 110 meters per second during a mission, and it would move approximately 11 meters during this period, compared to the along track resolution of 50 meters. This will result in some pixel smearing, but it will not significantly degrade the data.

A statistically independent sample is generated every time the antenna aperture is moved one half of its effective diameter. During this observation period, approximately 10 independent samples are generated. If the smallest possible pulse repetition interval were used, 25,000 samples would be recorded. Dividing these samples into eight Doppler bins at five different center frequencies yields 625 samples per bin. The coherent averaging of all of the samples in each bin would improve the signal to noise ratio by 28 dB, but the variance of the data would still be driven by the 10 statistically independent samples, resulting in a standard deviation that is about $\frac{1}{10}$ of the mean for coherent averaging.

A short pulse repetition interval results in a large number of samples that can be averaged, and the resulting signal processing gain can be used to lower the required transmitter power. This must be evaluated in comparison with the increased transmitted bandwidth, but that larger bandwidth is transmitted at a lower power.

The power received by the exemplified monostatic radar for surface scatter is given by $$P_r = \frac{P_t G^2 \lambda^2 \sigma^\circ A_{ill}}{(4\pi)^3 R^4}$$

where $P_t$ is the transmitter power, G is the antenna gain, $\lambda$ is the electromagnetic wavelength, $\sigma^\circ$ is normalized radar cross section of the forest scene, R is the range, and $A_{i11}$, is the area illuminated by the antenna. This equation is a simplification of the illumination integral, assuming beam-filled operation of the radar, an idealized antenna pattern, and that $\sigma^\circ$ is constant across the radar footprint.

The signal to thermal noise ratio is given by $$SNR = \frac{P_r}{kTBF}$$

where $P_r$ is the received power, k is Boltzman's constant ($1.38 \times 10^{-23}$ W Hz$^{-1}$ K$^{-1}$), T is the temperature in Kelvin (290K reference), B is the bandwidth of the system, and F is the noise figure of the receiver. If the range is taken as 300 meters, the gain of the antenna as 10 dBi, the wavelength as 3 meters, the minimum detectable normalized radar cross section as $-40$ dB, the illuminated area as 60 m$\times$250 m, the bandwidth is 500 kHz, and the noise figure as 4 dB, then the transmitter power required for a single pulse signal to noise ratio of 20 dB is 17 dBm, or 50 mW.

The geometry of the radar footprint placed on the ground, as shown in FIG. 5, may be any suitable size and shape as defined by the particular radar system used. The footprint 52 is shown to be subdivided into Doppler cells or bins 54$a$–54$h$, which may also vary is size and number from that shown in FIG. 5 depending on the particular operating parameters and results desired. The individual Doppler cell, which establishes the ultimate resolution of the system, is preferably about 50 meters wide (across track) and about 20–50 meters deep (along track). Each resolution cell represents a unique position on the map of the biomass area of interest and is a unique data point with a magnitude of average biomass at that point. Thus, in accordance with the instant invention a map may be generated which shows the magnitude of the biomass of the forest of interest as a function of location on the map.

Figure 6:
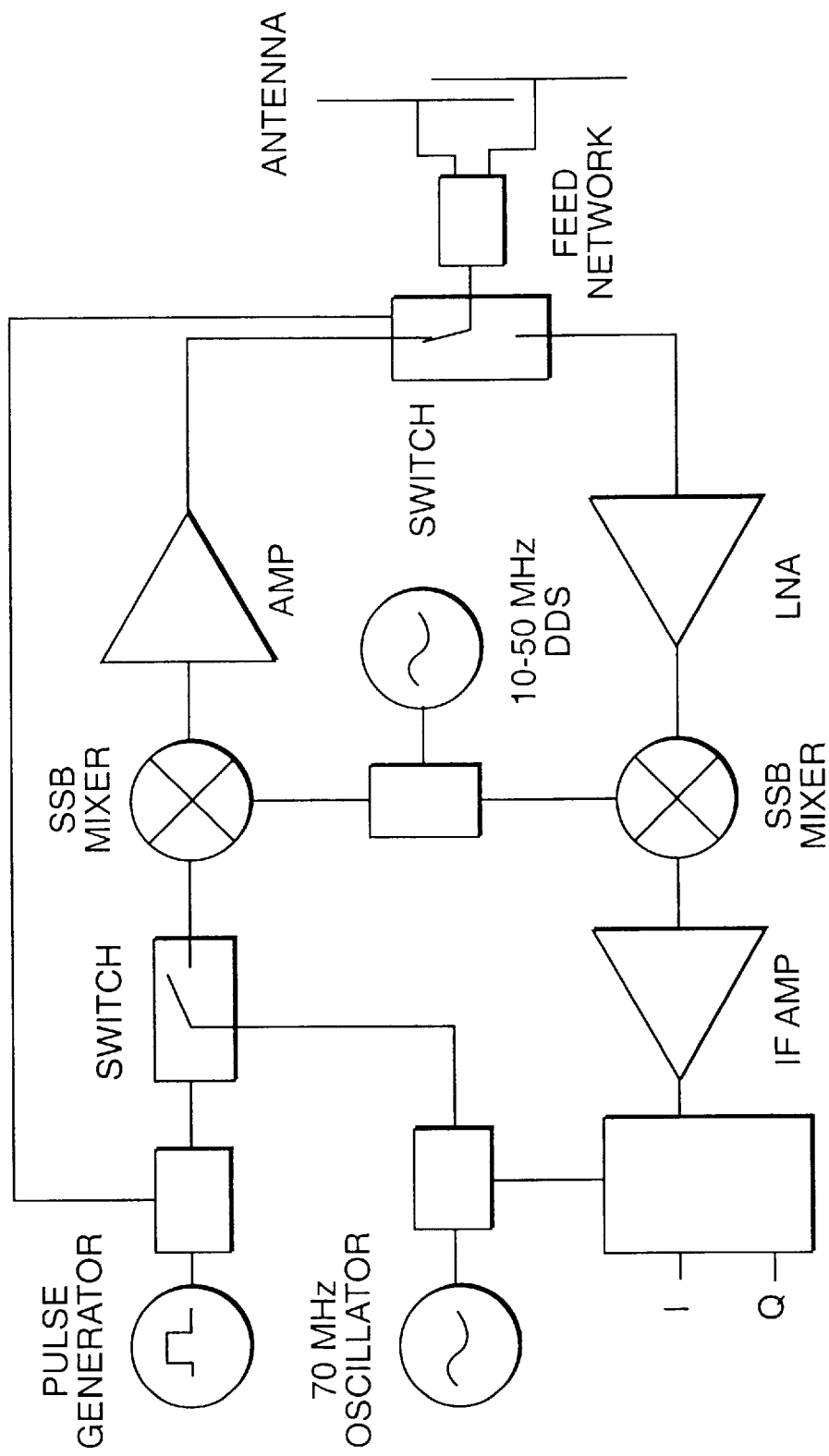
FIG. 6. shows a simplified block diagram of one embodiment of a radar system in accordance with the instant invention.

A simplified block diagram of an embodiment of the radar system is shown in FIG. 6, wherein the required filtering has been omitted for simplicity. A Direct Digital Synthesizer (DDS) is shown in this architecture for simplicity. The DDS allows the reprogramming of the radar's frequency on a pulse by pulse basis, if necessary, to reduce or eliminate radio frequency interference (RFI). A cheaper alternative can be used wherein two phase locked loops (PLL) are provided, and the system switches between them every 625 pulses, giving one PLL a chance to settle while the other is being used to up-convert the transmitted signal and down convert the received signal. Low cost commercial PLLs are available in this frequency band. The feed network shown contains the balun and matching network to match the antenna impedance to the coaxial feed line. This system is preferably capable of operating at center frequencies from 80 to 120 MHz. A 70 MHz IF is preferably used, because it is a common satellite receiver IF, and low cost commercial parts are readily available. The radar is constructed completely of either commercial equipment, or in the case of the antennas and matching units, based upon well established technology which can be readily implemented by a person skilled in the art. The radar preferably uses a low power transmitter, and compensates by using digital signal processing techniques to enhance the signal to noise ratio, average the data and separate it by incidence angle using an FFT.

Figure 7:
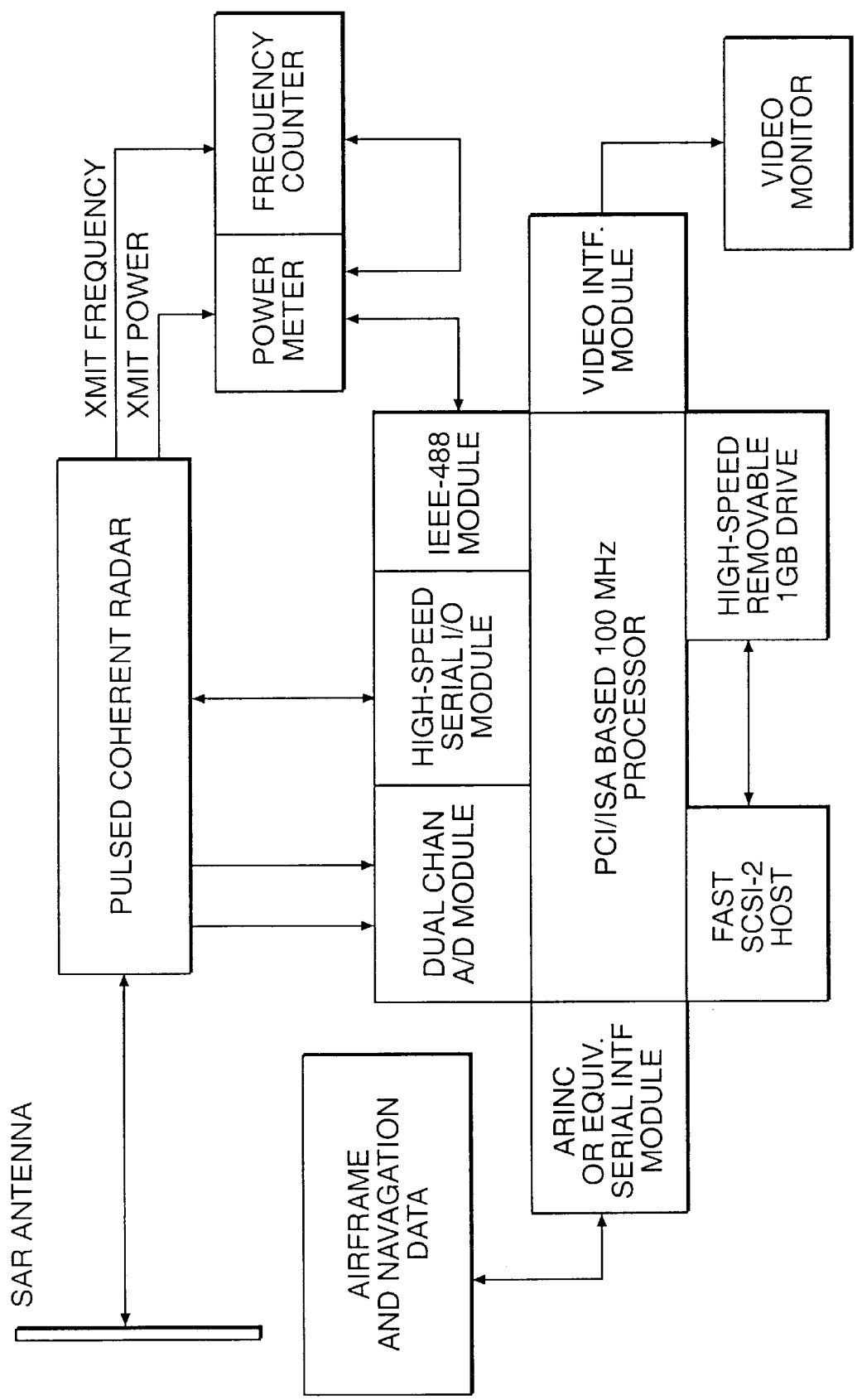
FIG. 7. shows a block diagram of the major components of the signal generating and processing system in accordance with the instant invention.

As is apparent from the above description, the instant invention relies on electronic signal generation and radiation equipment which directs energy directly at the ground. This energy passes through the canopy and is reflected by the tree trunks and the ground. Special gating circuitry is used to blank out the return from the ground directly under the aircraft. The major elements of the instant invention are shown in block diagram form in FIG. 7. The equipment includes two separate and parallel frequency-synthesizer circuits which generate the desired frequencies, a pulse modulator, a power amplifier, a monostatic antenna for both transmit and receive, receiver circuitry, and recording and storage devices.

In accordance with one embodiment of the invention, the Pulse Coherent Radar generates a pulse waveform which is about 4 microseconds long with the aircraft flying at 300 meters with about 600 mW Effective Radiated Power (ERP). The returned energy is amplified, demodulated and recorded. The stored data is individually time tagged and segregated by the Doppler frequency resulting from the movement of the aircraft.

The system is preferably small enough to fit into a single engine aircraft as shown in FIG. 8. The antenna is preferably mounted on the bottom of the fuselage in a downlooking attitude. The antenna is preferably a single printed circuit board bowtie element. The aircraft acts as the ground plane of the antenna. The radar equipment described above fits into a standard aircraft instrument rack and uses less than 250 Watts of power and weighs about 25 pounds.

An important aspect of the instant invention is the modeling and the analysis of the data collected. The actual radar data will vary as a function of incidence angle and frequency in response to the ensemble average of the length and height of all of the trees in the radar footprint. Once the data is collected an inversion algorithm is used to determine the biomass of the observed forest from the data. A polarimetric VHF radiative transfer model of foliage, and an inversion algorithm is used to estimate biomass from radar data. Validation of scattering models and the inversion algorithm can be achieved by using data from other sources. For example, the Defense Advanced Research Projects Agency (DARPA) has very high resolution VHF SAR data over forests of various densities that can be used for this purpose. It is noted that a considerable body of research has been done on radiative transfer modeling of vegetative canopies, including polarimetric modeling. A similar approach is preferably used in defining the model at VHF. The inversion algorithm enables the radar data to be processed into direct biomass estimates.

A considerable body of research has been done on radiative transfer modeling of vegetative canopies, including polarimetric modeling. However, most of this effort in the geoscience community has been at microwave frequencies. The same or a similar approach is used to develop the model at VHF, as one skilled in the art will readily understand. The assumption in the MIMICS model, for example, that the scattering from the ground is specular is less of an approximation and more true at VHF than at the microwave frequencies for which the model was originally formulated. For a radar remote sensing application, the radiative transfer equation can be formulated in terms of the extinction matrix, which describes the attenuation of a specific intensity due to absorption and scattering, and the phase matrix, which characterizes the coupling between the incident and scattered intensities at every point in the medium. For vector electromagnetic fields, the Stokes parameters are used for the specific intensities. This model is used to develop the inversion algorithm used to estimate biomass or sub-canopy soil conditions from the variation of the radar backscatter in frequency and incidence angle.

The data acquisition system is preferably PC-based and the analog-to-digital converter (ADC) is preferably provided on a PC card to lower system costs. The radar and data acquisition systems are preferably designed to go into a standard 19 inch aircraft instrument rack. The data acquisition system is preferably constructed using low cost commercial devices. Metal enclosures and ground planes are used for noise reduction and thermal control. Extensive power supply filtering is utilized because of the noisy power generally available on the aircraft used.

The radar is constructed in a known manner to generate very clean RF signals because of its frequency of operation. The VHF band is very crowded, thus the noise and spurious emissions radiated from a poor transmitter must be avoided.

System control and data acquisition software is used, which preferably uses software drivers that are available for the commercial analog to digital converter (ADC) and digital signal processing board. The control system is preferably PC based, and the control software is preferably developed in C using commercial tools. A look-up table is generated to convert the bits out of the ADC to received power. Specific measurements are made of the insertion loss of the feed network for the antenna. The radar data is calibrated and converted from units of received power into normalized radar cross section. As explained above, the polarimetric radiative transfer model is used to develop the inversion algorithm to estimate the biomass directly from the radar measurements.

The functional requirements for the software used in the instant invention are described below in connection with an exemplary embodiment of the instant invention. The calculation of the biomass for the selected region of interest is preferably made using data collected from the special purpose Synthetic Aperture Radar (SAR) described above. Inphase and Quadrature (I&Q) data is collected, for example, from a platform approximately 300 meters (R) above the ground flying at a nominal speed of 100 meters per second (V). The antenna is a two-meter (d) nadir oriented, enhanced dipole configuration with a nominal coverage of +/−200 meters (D) along track, and +/−300 meters perpendicular to track. Measurements are preferably made using VHF radar frequencies under 400 MHz, and preferably in the range 80 to 120 MHz. Depending upon the particular platform used for data collection and other experimental factors, these parameters may vary without deviating from the inventive scope of the instant invention.

Minimum data collection requirements are specified by the intrinsic resolution of the SAR; tresolong track resolution limit is d/2 or one meter. A statistically independent radar cross section (RCS) measurement can be obtained every one meter of flight. The minimum Pulse Repetition Frequency (PRF) for the configuration is thus given by the Doppler bandwidth from the scattering centers given by 2*V/d, that is, 100 Hz. This band includes signal returns from horizon to horizon. The range gate of the proposed radar process will reduce the aperture and its associated doppler band to a value of, preferably, no more than 50 Hz. The antenna geometry distributes this band +/−50 Hz on the baseband signal. For optimum resolution processing, a coherent set of complex data samples are taken over the track footprint length (D). At a velocity of 100 meters per second, this represents a four second data sample for a 400 meter aperture.

A 50 Hz doppler bandwidth implies that the basebanded doppler data from the ground return can be expected to be stationary within a several millisecond window. If the baseband I&Q data is filtered with a 50 Hz passband filter before the digital sampling process, then taking complex data samples at a 50 Hz rate would be sufficient.

The data is preferably oversampled in the data collection system, by fortifying the data with independent calculations made using up to five or more different frequencies in the VHF band of interest. This alone will multiply the effective sample rate by five. Another reason that oversampling is preferred relates to the use of a monostatic pulse doppler radar using a range gate to reduce signal contributions from outside the main beam. Since signal returns must be received on the transmit antenna after the conclusion of the transmit pulse, the receiver must respond with a relatively short finite impulse response as the full region of interest returns energy to the antenna. A radar pulse must be transmitted with sufficient duration to illuminate the full footprint of interest simultaneously. The data sample will be taken as the return illumination reaches the outer limit of the desired aperture. The Pulse Coherent Radar (PCR) system will insure pulse-to-pulse coherency for a complete data set across one footprint.

In a preferred embodiment, the radar platform is located at an altitude where the round trip propagation time at nadir is 2 microseconds. After a two microsecond pulse transmission, the transmitter will be turned off and the receiver will be opened. During the next microsecond, the receiver will intercept energy from the growing circle of illumination on the ground. If the return receiver data is sampled at the end of one microsecond, the return energy will be limited to an aperture of +/−42 degrees. If the receiver is left open for two microseconds, the aperture spreads to +/−60 degrees and the return illumination begins to recede from the terrain at nadir. Due to the finite response time of the receiver, peripheral aperture energy will not contribute quite as much signal to the data sample as the ground below.

An important characteristic of the pulse doppler system is the requirement for a receiver response time less than one microsecond. This implies an inherent noise bandwidth on the order of 1 MHz, much wider than the required doppler bandwidth of 50 Hz. This opens the door to spurious VHF signal intercepts and promotes the use of oversampling and coherent integration to suppress its effect. As long as the mission data storage facility is not strained, it is preferable to sample at the 250 kHz rate allowed by the 4 microsecond PRI and average (or digitally filter) out as much interfering noise as possible. It is also worth noting that if successive pulses are transmitted at the same frequency, returns from the previous pulse will be received from a slant angle 70 degrees from nadir. Reasonably 'quiet' bands of the VHF spectrum are preferably selected in which to operate, so that reduced sample rates may be practical. This lowers mission storage requirements as well as lowers post processing CPU loads.

If the Doppler bandwidth of the footprint being sampled were indeed as wide as 50 Hz, then an appropriate burst of sample data at each of five desired frequencies must be taken every 20 milliseconds. With an allocation of 4 milliseconds per frequency, digital sampling at a 250 kHz rate would provide a maximum of 1000 I&Q sample pairs to be averaged for each frequency for each 20 millisecond interval. As suggested above, the baseband I&Q data for the doppler return should be essentially stationary for this window. By coherently averaging these samples before sending to storage, a very significant reduction in data storage can be realized.

The success of the data collection process is in part dependent upon the noise environment at the collection site. In accordance with a preferred embodiment of the instant invention, prior to the acquisition of the radar return data, the receiver is be scanned across the spectrum to determine the location of offending transmitters, or conversely, the quiet regions where transmissions and returns will suffer the least adverse effects. A preliminary scan can be used to locate most interfering signals but is not guaranteed to isolate up to five noise free bands in which to carry out the collection. Given a particular noise spectrum, the most favorable bands can be identified and quantified for the feasibility of reliable collection. These measurement bands should obviously not fall on any 'forbidden' bands imposed by platform communications or other bands known to be a problem. Separate attenuators in the transmitter and receiver paths are used to position return samples in the proper linear region of the A/D converter.

In accordance with another aspect of the invention, a data collection alternative can be used, in which every other data sample is obtained in a 'receive only' mode where no pulse is transmitted. This interleaved sample set provides a 'real time' measure of the environment noise, provide a basis for data integrity, and possibly a basis for adjusting return data to suppress noise.

The radar system and its associated processor are able to permit complex (I&Q) data sampling rates or preferably up to 250 kHz. The parameters for a data session are set up and initiated using a graphical user interface (GUI) provided on the operators computer. The transmitter and receiver can be independently enabled or disabled and attenuators provide level control in each path. The transmitter preferable provides a CW, Pulse and Test mode for complete flexibility in testing and data collection.

Under Pulse mode operation, the operator is able to specify data collection within a small set of discrete frequencies or over a specified range of frequencies using a specified frequency step. Preferably, up to six separate frequencies can be specified for sequential data sampling. Frequencies can be selected, for example, within the 80 to 120 MHz band in 1 kHz steps. A Dwell Count is used to specify the number of pulses to be processed at each frequency during one sweep of the frequency set, wherein each sweep of the frequency set constitute a frame of data. A separate frame count specifies the number of frames to be included in one data session.

A special interleaved sampling mode may be used which is made possible by a pair of receiver filter channels. In this mode, alternate pulse samples are taken at two alternate frequencies within a frequency set. This mode alleviates problems from a 'previous' pulse return which would normally corrupt the received signal. Data sampling at some new pair of frequencies must be delayed until the two band filters are adjusted. The use of a negative frequency flag is used to specify data samples to be made without pulse transmissions. This provides samples of the noise environment at the specified frequency.

Separate parameters for the pulse mode include Pulse Width (PW), Pulse Repetition Interval (PRI), and the A/D trigger delay to be used. A test mode provides a simulated return signal to test the receiver and data sampling systems. Separate commands will be used to activate a session based upon the set parameters and to Abort an on-going session.

An outline of the preferred transmitter/receiver control functions is provided below:

1. Define and Implement PCR Controls for Setup: (STANDBY is default Mode Until Dynamic Scenario is Initiated)
    a.) Set Enable/Disable Transmit (Disabled for Receive only mode)
    b.) Set Pulse/CW mode (Receiver Disabled for CW mode; power measurement during CW cycle)
    c.) Set Transmit Attenuator (e.g. eight steps of one dB)
    d.) Set Transmit/Receive Frequency Set Between Absolute Limits of 80 and 120 MHz in 1 kHz steps. (80 to 100 and 100 to 120 MHz represent two separate receiver bands which can be preselected in approximately 600 microseconds. One to six frequencies in a set; A negative frequency calls for a Receive only set.)
    e.) Set Transmit/Receive Sweep Set Between Specified Lower and Upper Frequency Limits at Specified Step
    f.) Set Continuous/Interleaved Frequency Mode (Can be used in Discrete or Swept Frequency Sets Interleaved Mode will alternate adjacent samples at two frequencies in the set Frame; a 0.75 millisecond quiet period will be required to retune to the next frequency pair in the frame)
    g.) Set Pulse Frame Count to be used by all Frequencies (Must define a window to allow 0.75 milliseconds for tuning 'next' band on the alternate filter channel during sample block as required; nominally 300 to 1000 pulses; One set of samples for each frequency comprise a 'Frame' of data)
    h.) Set Frame Count for Complete Data Session
    i.) Enable/Disable Simulated Return (and Disable Transmit if enabled)
    j.) Set the PRI, 2 to 200 microseconds
    k.) Set the A/D trigger delay measured from conclusion of transmit clock pulse (Nominally one to two microseconds)
    l.) Set Receiver Attenuator
    m.) Enable/Disable Receiver
    n.) Activate Session
    o.) Abort Session The preferred analog-to-Digital conversion control functions are as follows. The system generates configuration files for analog-to-digital conversion tests, for example of a $PCI_{13}416$ A/D Board. Preferably, The A/D converter does not run under Windows. The data is saved in disk files. A block of data samples are generated for the requested radar sample set. The A/D process is started and ready to receive the first pulse in a data block. Clocking of data samples is made possible from an external source such as the transmitter, or from the A/D internal clock. A time and spectrum plot with, for example, a 1 kHz Resolution is then provided for the A/D disk files. A windows utility is used to provide time and spectrogram plots of selected data.

Preferably, either a set of digital lines or one serial I/O line is used to communicate between the host processor and the Pulse Coherent Radar (PCR). If the mode definitions for the PCR are limited, the setting of digital lines would simplify the PCR Design. For such modes as multiple frequency interleaved pulse modes, it is not practical for the host processor to direct every pulse; hence, the entire scenario should reside at the PCR. Thus, the PCR is preferably equipped with a low end programmable Digital Signal Processing (DSP) device with serial and parallel I/0 to provide a means of handling the mode controls. A small program in the DSP can be used to parse the directives from the host and transfer the digital controls to the receiver at rates compatible with frequency interleaved pulses as they are required.

The user interface to the instant system is preferably a Windows style GUI providing simple operation of the data collection system and controls to execute any selected features of the system. Normal data collection functions are carried out using pre-programmed procedures which test the system components, sample the electrical environment, set the measurement frequencies and collect the footprint data. These functions preferably include: Set up 'forbidden' bands file where radio silence is required; system test; environmental measurements and band selection; transmitter level control; data collection; and data inspection.

The system test mode of the instant radar system implements a simulated return to be generated in place of the normal ground return. A 10 Hz square-wave amplitude modulation is placed on the signal to the antenna driver and is fed into the receiver in place of the usual antenna return. Regardless of where the receiver is tuned, the return baseband signal will carry the 10 Hz sideband and its harmonics. The rise and fall times of the test modulation are stretched to limit the simulated return to about a dozen harmonics. The system test will take simulated footprints at, for example, six frequencies, 80.002, 90.0, 99.998, 100.002, 110.0 and 119.998 Mhz. These frequencies represent the central and outer skirts of the upper and lower filter bands in the radar receiver.

With respect to the environmental measurements and band selection, prior to data collection, a receive only scan of the entire usable spectrum is made to identify regions of high ambient noise and those quiet regions where operation will be desirable. Analysis software is preferably used to provide suggestions for the best bands in which to operate based on the environmental analysis.

With respect to the transmitter level control, the last step before data collection preferably includes a trial run at the selected frequencies to determine that the returns levels are within the proper dynamic range for the A/D converter. Normally, the transmitter is operated at full power to provide the highest signal-to-noise ratio at the receiver; the receiver attenuator is then adjusted for optimum data collection. Should the terrain return such high level signals that the receiver attenuator is not sufficient, then the transmitter signal can be attenuated. Also, it may be necessary to reduce transmitter power if it is not prudent to operate at full transmit power.

With respect to data collection, once the parameters have been established for a run and the platform is in position, the data collection process is initiated from the system console. Data is spooled to a removable storage medium for subsequent processing.

With respect to data inspection, as each data session is run, the operator preferably has the option to scan the temporal and spectral characteristics of portions of the data to evaluate their utility. If for any reason the data is shown to be inadequate, then parameters can be altered and a second data pass is made.

The current embodiment includes a GPS receiver to log accurate position, bearing and speed throughout the data collection sessions, with updates each second. The embodiment will include instrumentation to track the airborne platform attitude to ensure that measurements are corrected for antenna boresight orientation.

A brief technical description of one embodiment of implementing the instant invention is provided below. The example below is based on an antenna wherein computed patterns for the antenna show gain flat across 80–120 MHz. Gain is about 1.9 dBi. The beamwidth is 90 degrees along track and 120 degrees across track.

Aircraft Operating Altitude=300 meters (984 ft);
Aircraft Speed=150 kts (76.2 meters/sec);
Antenna Beamwidth, Along Track=±45°;
at 300 meters altitude, along track dimension=600 meters;
Antenna Beamwidth, Across Track=±60°;
at 300 meters altitude, across track dimension=400 meters;
Operating Frequencies=80–120 MHz;

Thus, the radar has a 600×400 meter generally circular shape footprint. The forest of interest is overflown with the radar system mounted thereon, and all active frequencies are received and recorded. The active frequencies are used to form a frequency file and the transmitter is tuned to avoid these frequencies. Five transmit frequencies are selected, around the vicinity of 80, 90, 100, 110, 120 MHz tuned to avoid all active frequencies. The Varactors take ~600 usec to settle. The instant operation consists of the measurement of a series of 10,000 meter×400 meter strips. Between strips the active frequency file is updated.

At flight speed of 76.2 meters/sec, induced Doppler spread will be:

$f_{d(max)}=2$ Velocity/$\lambda$ where $\lambda$ (80 MHz)=4.05 mt

Observe: 50% Bandwidth
$\lambda$(100 MHz)=3.24 mt
$\lambda$(120 MHz)=2.7 mt

| fd = +/−37.6 Hz ( 80 MHz) |
| +/−47.0 Hz (100 MHz) |
| +/−56.4 Hz (120 MHz) |

Twenty (20) Doppler bins per footprint are selected in this example;

five (5) Transmit/Receive frequencies between 80–120 MHz are used. 500 pulses per frequency per footprint are generated;
Time to transit one Doppler cell t=x/v
v=velocity=76.2 mt/sec
 x=length=600/20 mt=30/76.2
 Time to transit: t=394 millisec;
A/D Max Sample Rate=1M Sample per sec;
2 Words per sample, I & Q. Each word has 14 bits plus 2 bit I/Q;
Need 500 pulses per frequency per cell, thus,
 5 freqs×500 pulses=2500 samples;
Sample rate (PRF) is 2500 samples per Doppler cell, which is:

=2500 sample/394 millisec;
Therefore, PRF(Minimum)=6345 Hz and PRI=157 usec;

At Maximum sample rate, 1 MS/sec (PRF Max.), number of Samples/footprint=1 Mhz×394 millisec/2 words per sample;
Number of Samples/footprint at Max Sample Rate: PRF=197,000 Hz, PRI=5.076 usec;
Use Pulse Duration of 2 usec, PRI of 4 usec, PRF=250 KHz;
At speed=c, 1 usec=about 150 meters;
Data Rate: Bytes/Sample=(Word Length×Words per Sample)=2 Bytes×2=4;
Max data rate=Bytes/Sample×PRF=4 ×250 Khz=1.0 MB/sec;
Data per run:
 Strips will be 400 meters wide by 10000 meters long;
 x=Vt, t=x/v=10000 meters/76.2 mt per sec=131.23 sec/60 sec/min=2.187 min to run strip;
 131.2 sec/strip×1.0 MB/sec=131.2 MB/run;
Data Manipulation:
 Each Doppler Bin will have 2.5K Samples at 5 different frequencies as the footprint covers the individual Doppler cell;
 Thus, 500 samples per frequency, over 394 millisec. But, each cell is in the beamwidth while the full footprint is passing over. Therefore, each cell gets:
 500 samples/cell×20 cells/footprint=10000 samples;
 Time for sampling is time to cover 1 footprint=7.88 seconds;
 The sampling is coherent, so it can be assumed that Doppler resolution is 1/T where T is 7.88 sec;
 Therefore, Doppler resolution within each Doppler cell should be: 0.127 Hz;
 Each Pulse/Sample is time tagged and all samples per freq per Doppler bin are averaged; (Samples are in units of Db backscatter, RCS);
 The single pulse data sets are converted to individual I and Q data sets in the receiver;
 The aircraft flies at 150 Kts and covers a strip 5 by 400 meters wide;
 An inversion algorithm is then applied to the data to convert the data to a magnitude of biomass for each cell, and a map is generated of the area of interest showing the biomass in tons/hectare as a function of location thereon.

The above operational example is provided as only a non-limiting example of the operational parameters that may be used in implementing the present invention. The parameters and operations described above may be modified or changed depending on the particular application in which the instant invention is used.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such changes and modifications which come within the full scope and true spirit of the invention.

What is claimed:

1. Method of remote measurement of terrestrial biomass contained in vegetative elements present in an area of interest, said method comprising the steps of:
 providing an airborne radar system;
 overflying said area of interest while directing radar energy from said radar system toward said area of interest, wherein said radar energy has a frequency of below 400 MHz and a plurality of radar resolution cells are defined on said area of interest;

using said radar system to collect backscatter data from backscatter from said radar energy as a function of incidence angle and frequency for each of said plurality of given radar resolution cells in said area of interest; and using an inversion algorithm to determine a magnitude of said biomass in said vegetative elements from said backscatter data for each of said plurality of resolution cells in said area of interest.

2. The method as defined in claim 1, wherein said radar energy is selected to have a frequency of between approximately 80 MHz to approximately 120 MHz.

3. The method as defined in claim 1, wherein said step of directing radar energy includes directing a plurality of different discrete radar frequencies under 400 MHz at each of said resolution cells.

4. The method as defined in claim 2, wherein said step of directing radar energy includes directing a plurality of different discrete radar frequencies between approximately 80 MHz to approximately 120 MHz at each of said resolution cells.

5. The method as defined in claim 3, wherein said step of directing radar energy includes using five different radar frequencies under 400 MHz for each of said resolution cells.

6. The method as defined in claim 4, wherein said step of directing radar energy includes using five different radar frequencies between approximately 80 MHz to approximately 120 MHz for each of said resolution cells.

7. The method as defined as defined in claim 6, wherein said five different radar frequencies are selected to be approximately 80 MHz, 90 MHz, 100 MHz, 110 MHz and 120 MHz.

8. The method as defined in claim 1, wherein said step of providing an airborne radar system includes using a synthetic aperture radar antenna and a pulsed coherent radar in said radar system.

9. The method as defined in claim 7, wherein said step of providing an airborne radar system includes using synthetic aperture radar processing and a pulsed coherent radar in said radar system.

10. The method as defined in claim 1, further including the step of generating a map of said area of interest showing the magnitude of said biomass of said vegetative elements as a function of location on said map by using each of said resolution cells as a unique location on said map.

11. The method as defined in claim 6, further including the step of generating a map of said area of interest showing the magnitude of said biomass of said vegetative elements as a function of location on said map by using each of said resolution cells as a unique location on said map.

12. The method as defined in claim 1, further including performing a receive only scan of a usable frequency spectrum to identify unusable regions and selecting said frequency to avoid said unusable regions.

13. The method as defined in claim 1, further including using said method to determine the biomass contained within tree trunks located in said area of interest.

14. The method as defined in claim 1, further including using said method to determine the biomass contained in crops located within said area of interest.

15. Method of remote measurement of soil characteristics present in an area or interest, said method comprising the steps of:

provideing an airborne radar system;

overflying said area of interest while directing radar energy from said radar system toward said area of interest, wherein said radar energy has a frequency of below 400 MHz and a plurality of radar resolution cells are defined on said area of interest;

using said radar system to collect backscatter data from backscatter from said radar energy as a function of frequency for each of said plurality of given radar resolution cells in said area of interest; and using an inversion algorithm to determine soil characteristics from said backscatter data for each of said plurality of resolution cells in said area of interest.

16. A system for remote measurement of terrestrial biomass contained in vegetative elements present in an area of interest, said system comprising:

a radar system operable to be connected in a down looking manner on an airborne object, wherein said radar system includes:

means for directing radar energy from said radar system toward said area of interest while said airborne object overflies said area of interest, wherein said radar energy has a frequency of below 400 MHz and a plurality of radar resolution cells are defined on said area of interest; and means for collecting backscatter data from backscatter from said radar energy as a function of incidence angle and frequency for each of said plurality of given radar resolution cells in said area of interest;

said system further including means for applying an inversion algorithm to determine a magnitude of said biomass in said vegetative elements from said backscatter data for each of said plurality of resolution cells in said area of interest.

17. The system as defined in claim 16, wherein said radar energy has a frequency of between approximately 80 MHz to approximately 120 MHz.

18. The system as defined in claim 17, wherein said means for directing radar energy includes means for directing a plurality of different discrete radar frequencies between approximately 80 MHz to approximately 120 MHz at each of said resolution cells.

19. The system as defined in claim 18, wherein said means for directing a plurality of different discrete radar frequencies is operable to direct five different radar frequencies between approximately 80 MHz to approximately 120 MHz for each of said resolution cells.

20. The system as defined in claim 16, wherein said radar system includes means for synthetic aperture radar processing and a pulsed coherent radar which is operable to generate a pulsed coherent radar waveform as said radar energy.

21. The system as defined in claim 16, further including means for generating a map of said area of interest showing the magnitude of said biomass of said vegetative elements as a function of location on said map by using each of said resolution cells as a unique location on said map.

22. The system as defined in claim 16, wherein said radar system includes means for performing a receive only scan of a usable frequency spectrum to identify unusable regions and means for selecting said frequency to avoid said unusable regions.

23. A radar system for remote measurement of terrestrial biomass contained in vegetative elements present in an area of interest, said radar system comprising:

means for connecting said radar system in a down looking manner on an airborne object;

means for directing radar energy from said radar system toward said area of interest while said airborne object overflies said area of interest, wherein said radar energy has a frequency of below 400 MHz and a plurality of radar resolution cells are defined on said area of interest; and means for collecting backscatter data from backscatter from said radar energy as a function of incidence angle and frequency for each of said plurality of given radar resolution cells in said area of interest.

24. The radar system as defined in claim 23, wherein said radar energy has a frequency of between approximately 80 MHz to approximately 120 MHz.

25. The radar system as defined in claim 23, wherein said means for directing radar energy includes means for directing a plurality of different discrete radar frequencies between approximately 80 MHz to approximately 120 MHz at each of said resolution cells.

26. The radar system as defined in claim 25, wherein said means for directing a plurality of different discrete radar frequencies is operable to direct five different radar frequencies between approximately 80 MHz to approximately 120 MHz for each of said resolution cells.

27. The radar system as defined in claim 23, wherein said radar system includes means for synthetic aperture radar processing and a pulsed coherent radar which is operable to generate a pulsed coherent radar waveform as said radar energy.

28. The radar system as defined in claim 23, wherein said radar system includes means for performing a receive only scan of a usable frequency spectrum to identify unusable regions and means for selecting said frequency to avoid said unusable regions.

* * * * *